US009742927B2

(12) United States Patent
Li

(10) Patent No.: US 9,742,927 B2
(45) Date of Patent: Aug. 22, 2017

(54) ONLINE CHARGING METHOD FOR ALWAYS ON IP CONNECTIVITY

(71) Applicant: Alcatel Lucent, Boulogne Billancourt (FR)

(72) Inventor: Xiangyang Li, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 89 days.

(21) Appl. No.: 14/606,286

(22) Filed: Jan. 27, 2015

(65) Prior Publication Data

US 2015/0215473 A1    Jul. 30, 2015

(30) Foreign Application Priority Data

Jan. 29, 2014   (CN) .......................... 2014 1 0042946

(51) Int. Cl.
*H04M 15/00*    (2006.01)
*H04W 4/24*    (2009.01)
(Continued)

(52) U.S. Cl.
CPC ........ *H04M 15/64* (2013.01); *H04L 12/1403* (2013.01); *H04L 12/1467* (2013.01); *H04M 15/70* (2013.01); *H04M 15/74* (2013.01); *H04M 15/8214* (2013.01); *H04M 15/8228* (2013.01); *H04W 4/24* (2013.01); *H04L 65/1066* (2013.01)

(58) Field of Classification Search
CPC . H04L 12/14–12/1496; H04L 65/10–65/1096; H04M 2215/00–2215/68; H04M 15/64; H04M 15/8228; H04M 15/70; H04M 15/74;
(Continued)

(56) References Cited

U.S. PATENT DOCUMENTS 7,545,764 B1 * 6/2009 Francis ................ H04B 7/2126
342/356
2005/0009500 A1 * 1/2005 Ear ....................... H04M 15/00
455/408
(Continued)

*Primary Examiner* — Edan Orgad
*Assistant Examiner* — Ivan O Latorre
(74) *Attorney, Agent, or Firm* — Fay Sharpe, LLP

(57) ABSTRACT

The invention relates to an online charging method for always on IP connectivity in a communication system, the method comprises a Diameter router receiving an online charging request from a Diameter client, wherein the online charging request includes subscriber information; the Diameter router finding a corresponding online charging system in a subscriber index database based on the subscriber information; sending a successful acknowledge to the Diameter client and generating a ticket file when the corresponding online charging system does not exist in the subscriber index database or the corresponding online charging system is not available, wherein the successful acknowledge includes a dummy quota specified by the Diameter router; and the ticket file processor reading the ticket file based on a scheduled timing and generating a first online charging event request and sending the first online charging event request to the Diameter router when the corresponding online charging system exists in the subscriber index database or the corresponding online charging system is available.

9 Claims, 2 Drawing Sheets

(51) Int. Cl.
*H04L 12/14* (2006.01)
*H04L 29/06* (2006.01)

(58) Field of Classification Search
CPC .... H04M 15/8214; H04W 4/24; G06Q 30/04; G06Q 40/12
See application file for complete search history.

(56) References Cited

U.S. PATENT DOCUMENTS

| | | | |
|---|---|---|---|
| 2007/0280447 A1* | 12/2007 | Cai | H04M 15/00 379/114.03 |
| 2010/0299451 A1* | 11/2010 | Yigang | H04L 45/306 709/241 |
| 2010/0332361 A1* | 12/2010 | Zhou | H04L 12/1403 705/30 |
| 2011/0040663 A1* | 2/2011 | Cai | H04L 12/14 705/30 |
| 2011/0264778 A1* | 10/2011 | McGregor | G06F 9/5016 709/223 |
| 2012/0123919 A1* | 5/2012 | Li | G06Q 30/04 705/34 |
| 2012/0158993 A1* | 6/2012 | McNamee | H04L 45/42 709/238 |
| 2012/0184244 A1* | 7/2012 | Cai | H04L 12/14 455/408 |
| 2013/0326061 A1* | 12/2013 | Li | H04L 12/1407 709/224 |
| 2014/0189151 A1* | 7/2014 | Aviv | H04L 67/1004 709/233 |
| 2014/0307537 A1* | 10/2014 | Baer | H04L 65/1016 370/216 |

* cited by examiner

ONLINE CHARGING METHOD FOR ALWAYS ON IP CONNECTIVITY

FIELD OF THE INVENTION

The present invention relates to the communication technology, and particularly to an online charging method for always on IP connectivity in a communication network.

BACKGROUND OF THE INVENTION

Nowadays, with the rapid development of the mobile Internet technology, operators also find that the data traffic is increased in an exponential way. Moreover, 4G LTE achieves always on IP connectivity feature and IP sessions will remain active even for several months from the attachment status to the detachment status.

However, all these factors also creates more charging transactions to the online charging system (OCS), and the network operators need to often extend the capacity of the online charging system to adapt the increasing TPS (transaction per second). In order to extend the capacity of the online charging system, operators will need to install new hardware box, and move some subscriber's account profiles in one hardware box to a new hardware box to offload the current system. This kind of activity is called as "re-homing" in the telecommunication term. During the re-homing period, online charging system is not allowed to handle these subscribers' charging request from the network, and thus the subscriber current on-going long data session will be cut off and new charging session establishment will be rejected. This will greatly impact the end user's experience of accessing data network due to this kind of network maintenance activity.

SUMMARY OF THE INVENTION

In view of the prior art and the technical problem thereof identified as above, the invention proposes an online charging method for always on IP connectivity in a communication system, the method comprises the following steps:

First, a Diameter router receives an online charging request from a Diameter client, wherein the online charging request includes subscriber (Subscription ID) information;

Subsequently, the Diameter router finds a corresponding online charging system in a subscriber index database based on the subscriber information;

Then, a successful acknowledge is sent to the Diameter client and a ticket file is generated when the corresponding online charging system does not exist in the subscriber index database or the corresponding online charging system is not available, wherein the successful acknowledge includes a dummy quota specified by the Diameter router; and Finally, the ticket file processor 228 reads the ticket file based on a scheduled timing and generating a first online charging event request and sending the first online charging event request to the Diameter router when the corresponding online charging system exists in the subscriber index database or the corresponding online charging system is available.

In the present invention, although the corresponding online charging system does not exist in the subscriber index database or the corresponding online charging system is not available, the successful acknowledge is sent to the Diameter client and the successful acknowledge includes a dummy quota specified by the Diameter router, thus the function of the core network will not be negatively influenced due to a temporary failure of the online charging system; In addition, the ticket file is also generated at the same time and the ticket file processor reads the ticket file based on a scheduled timing and generates a first online charging event request and sends the first online charging event request to the Diameter router when the corresponding online charging system exists in the subscriber index database or the corresponding online charging system is available and thus an optimal configuration is achieved.

In one embodiment of the present invention, in the third step, the corresponding online charging system does not exist in the subscriber index database or the corresponding online charging system is not available when the online charging system is maintained.

In one embodiment of the present invention, maintenance of the online charging system is achieved by rehoming tool. Those skilled in the art should understand that it is also possible to use other implementation ways, i.e. the present invention is not limited to the scheme of using rehoming tool.

In one embodiment of the present invention, the rehoming tool transfers data in the online charging system to a target online charging system.

In one embodiment of the present invention, the rehoming tool is further configured to read data in the subscriber index database and update the data in the subscriber index database after transfer procedure is finished.

In one embodiment of the present invention, the online charging system contains a primary online charging system and a back-up online charging system. The primary online charging system possesses a higher priority to be used when the primary online charging system is available.

In one embodiment of the present invention, the back-up online charging system is activated when the primary online charging system is failed. The back-up online charging system is used when the primary online charging system is not available. In addition, the back-up online charging system is also used when the primary online charging system is not available due to temporary failure and the primary online charging system possesses is used again when the primary online charging system is available again.

In one embodiment of the present invention, in the fourth step a step of updating charging file based on the first online charging event request further comprises:

the Diameter router 224 is scheduled to send the first online charging event request in the off-peak time with speed control based on a record in a log file to avoid an overload of the online charging system. In such a manner, the peak load of the online charging system is avoided and thus the utilizing efficiency of the online charging system is improved.

To sum up, in the present invention, although the corresponding online charging system does not exist in the subscriber index database or the corresponding online charging system is not available, the successful acknowledge is sent to the Diameter client and the successful acknowledge includes a dummy quota specified by the Diameter router, thus the function of the core network will not be negatively influenced due to a temporary failure of the online charging system; In addition, the ticket file is also generated at the same time and the ticket file processor reads the ticket file based on a scheduled timing and generates a first online charging event request and sends the first online charging event request to the Diameter router when the corresponding online charging system exists in the subscriber index database or the corresponding online charging system is available and thus an optimal configuration is achieved.

BRIEF DESCRIPTION OF DRAWINGS

Other features, objects and advantages of the invention will become more apparent upon review of the following detailed description of non-limiting embodiments taken with reference to the drawings in which.

Identical or similar devices (modules) or steps will be denoted by identical or similar reference numerals throughout the drawings.

DETAILED DESCRIPTION OF EMBODIMENTS

The following described particular description of preferred embodiments will be given with reference to the drawings constituting a part of the invention. The drawings exemplarily illustrate particular embodiments, in which the invention can be practiced. The exemplary embodiments are not intended to exhaust all the embodiments of the invention. As can be appreciated, other embodiments can be possible or structural or logical modifications can be made without departing from the scope of the invention. Thus the following detailed description is not intended to be limiting, and the scope of the invention will be defined as in the appended claims.

Figure 1:
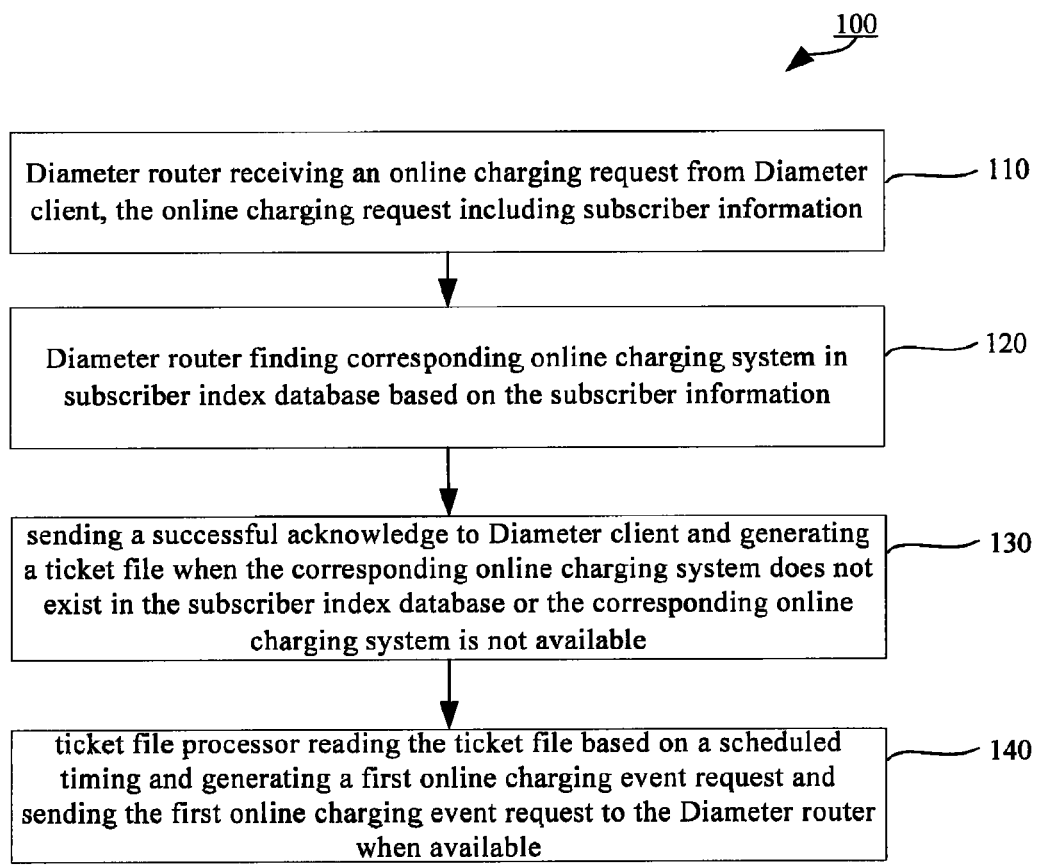
FIG. 1 illustrates a flow chart 100 of an online charging method for always on IP connectivity.
Figure 2:
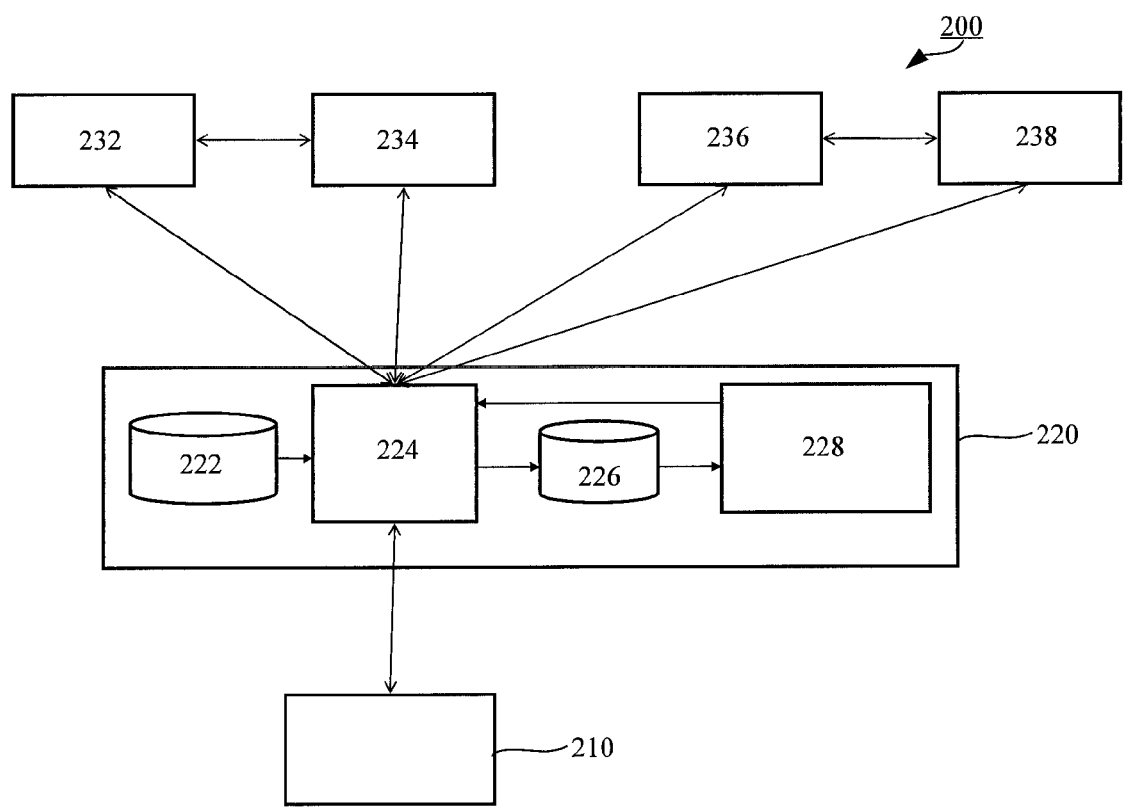
FIG. 2 illustrates a diagram 200 of a network structure in which the method according to the present invention could be applied.

FIG. 1 illustrates an online charging method 100 for always on IP connectivity in a communication system and FIG. 2 illustrates a diagram 200 of a network structure in which the method according to the present invention could be applied. In the following the method according to the present invention is described with reference to the FIG. 1 and FIG. 2, the method comprises the following steps:

First, in the step 110, a Diameter router 224 receives an online charging request from a Diameter client 210, wherein the online charging request includes subscriber (Subscription ID) information;

Subsequently, in the step 120, the Diameter router 224 finds a corresponding online charging system (namely a target host) in a subscriber index database 222 based on the subscriber information; Those skilled in the art should understand that the online charging system herein may be one or more of 232, 234, 236, and 238.

Then, in the step 130, a successful acknowledge is sent to the Diameter client 210 and a ticket file 226 is generated when the corresponding online charging system does not exist in the subscriber index database 222 or the corresponding online charging system is not available, wherein the successful acknowledge includes a dummy quota specified by the Diameter router 224; and Finally, in the step 140, the ticket file processor 228 reads the ticket file 226 based on a scheduled timing and generates a first online charging event request and sends the first online charging event request to the Diameter router 224 when the corresponding online charging system exists in the subscriber index database 222 or the corresponding online charging system is available.

In the present invention, although the corresponding online charging system does not exist in the subscriber index database 222 or the corresponding online charging system is not available, the successful acknowledge is sent to the Diameter client 210 and the successful acknowledge includes a dummy quota specified by the Diameter router 224, thus the function of the core network will not be negatively influenced due to a temporary failure of the online charging system; In addition, the ticket file is also generated at the same time and the ticket file processor 228 reads the ticket file 226 based on a scheduled timing and generates a first online charging event request and sends the first online charging event request to the Diameter router 224 when the corresponding online charging system exists in the subscriber index database 222 or the corresponding online charging system is available and thus an optimal configuration is achieved.

In one embodiment of the present invention, in the step 130, the corresponding online charging system does not exist in the subscriber index database or the corresponding online charging system is not available when the online charging system is maintained.

In one embodiment of the present invention, maintenance of the online charging system is achieved by rehoming tool. Those skilled in the art should understand that it is also possible to use other implementation ways, i.e. the present invention is not limited to the scheme of using rehoming tool.

In one embodiment of the present invention, the rehoming tool transfers data in the online charging system to a target online charging system.

In one embodiment of the present invention, the rehoming tool is further configured to read data in the subscriber index database and update the data in the subscriber index database after transfer procedure is finished.

In one embodiment of the present invention, the online charging system contains a primary online charging system and a back-up online charging system. The primary online charging system possesses a higher priority to be used when the primary online charging system is available.

In one embodiment of the present invention, the back-up online charging system is activated when the primary online charging system is failed. The back-up online charging system is used when the primary online charging system is not available. In addition, the back-up online charging system is also used when the primary online charging system is not available due to temporary failure and the primary online charging system possesses is used again when the primary online charging system is available again.

In one embodiment of the present invention, in the step 140 a step of updating charging file based on the first online charging event request further comprises:

the Diameter router 224 is scheduled to send the first online charging event request in the off-peak time with speed control based on a record in a log file to avoid an overload of the online charging system. In such a manner, the peak load of the online charging system is avoided and thus the utilizing efficiency of the online charging system is improved.

To sum up, in the present invention, although the corresponding online charging system does not exist in the subscriber index database 222 or the corresponding online charging system is not available, the successful acknowledge is sent to the Diameter client 210 and the successful acknowledge includes a dummy quota specified by the Diameter router 224, thus the function of the core network will not be negatively influenced due to a temporary failure of the online charging system; In addition, the ticket file is also generated at the same time and the ticket file processor 228 reads the ticket file 226 based on a scheduled timing and generates a first online charging event request and sends the first online charging event request to the Diameter router 224 when the corresponding online charging system exists in the subscriber index database 222 or the corresponding online charging system is available and thus an optimal configuration is achieved.

Those skilled in the art shall appreciate that the invention apparently will not be limited to the foregoing exemplary embodiments and can be embodied in other specific forms without departing from the spirit or essence of the invention. Accordingly the embodiments shall be construed anyway to be exemplary and non-limiting. Moreover apparently the term "comprising" will not preclude another element(s) or step(s), and the term "a" or "an" will not preclude plural. A plurality of elements stated in an apparatus claim can alternatively be embodied as a single element. The terms "first", "second", etc., are intended to designate a name but not to suggest any specific order.

The invention claimed is:

1. An online charging method for always on IP connectivity in a communication system, the method comprising:
   a Diameter router receiving an online charging request from a Diameter client, wherein the online charging request includes subscriber information;
   the Diameter router finding a corresponding online charging system in a subscriber index database based on the subscriber information;
   sending a successful acknowledge to the Diameter client and generating a ticket file when the corresponding online charging system does not exist in the subscriber index database or the corresponding online charging system is not available, wherein the successful acknowledge includes a dummy quota specified by the Diameter router; and
   sending the ticket file to a ticket file processor;
   whereby, based on a scheduled timing, the ticket file processor may generate a first online charging event request and send the first online charging event request to the Diameter router when the corresponding online charging system exists in the subscriber index database or the corresponding online charging system is available.

2. The online charging method according to claim 1, wherein in the sending the successful acknowledge, the corresponding online charging system does not exist in the subscriber index database or the corresponding online charging system is not available due to the online charging system undergoing maintenance.

3. The online charging system according to claim 2, wherein maintenance of the online charging system is achieved by a rehoming tool.

4. The online charging system according to claim 3, wherein the rehoming tool transfers data in the online charging system to a target online charging system.

5. The online charging system according to claim 3, wherein the rehoming tool is further configured to read data in the subscriber index database and update the data in the subscriber index database after transfer procedure is finished.

6. The online charging method according to claim 1, wherein the online charging system contains a primary online charging system and a back-up online charging system.

7. The online charging method according to claim 6, wherein the back-up online charging system is activated when the primary online charging system is failed.

8. The online charging method according to claim 1 further comprising:
   the ticket file processor receiving the ticket file and reading the ticket file based on a scheduled timing and generating a first online charging event request and sending the first online charging event request to the Diameter router when the corresponding online charging system exists in the subscriber index database or the corresponding online charging system is available.

9. The online charging method according to claim 8, further comprising:
   scheduling the Diameter router to send the first online charging event request to the online charging system in the off-peak time with speed control based on a record in a log file to avoid an overload of the online charging system.

* * * * *